United States Patent [19]

Torres

[11] Patent Number: 5,140,678

[45] Date of Patent: Aug. 18, 1992

[54] COMPUTER USER INTERFACE WITH WINDOW TITLE BAR ICONS

[75] Inventor: Robert J. Torres, Colleyville, Tex.

[73] Assignee: International Business Machines Corporation, Armonk, N.Y.

[21] Appl. No.: 519,189

[22] Filed: May 4, 1990

[51] Int. Cl.$^5$ .............................................. G06F 3/14
[52] U.S. Cl. ...................................... 395/159; 395/157
[58] Field of Search ............... 395/159, 157, 156, 158, 395/160

[56] References Cited

U.S. PATENT DOCUMENTS 4,899,136  2/1990  Beard et al. ................. 395/159 X

OTHER PUBLICATIONS

Macintosh Manual, Apple Computer, Inc., 1983, pp. 15, 103.

Primary Examiner—David L. Clark
Attorney, Agent, or Firm—Jonathan E. Jobe, Jr.

[57] ABSTRACT

Disclosed is a computer system user interface that includes a window frame with a window title bar icon. The title bar icon replaces the conventional window title bar and it increases the usable client area of the window without decreasing the number of functions available to the user.

19 Claims, 10 Drawing Sheets ns with user created window icons.

COMPUTER USER INTERFACE WITH WINDOW TITLE BAR ICONS

BACKGROUND OF THE INVENTION

1. Field of the Invention

The present invention relates generally to computer system user interfaces, and more particularly to a computer system user interface in which the window title bar, command bar, and scroll bars are replaced with an icon.

2. Description of the Prior Art

Presently existing operating systems allow many computer applications to share the computer display screen. The sharing is possible because the applications interact with parts of the screen, which are called windows, rather than with the entire screen. The computer user, rather than the application, controls the size and arrangement of the windows.

The fundamental components of a window are the title bar, window border, action bar, scroll bars, and client area. The title bar identifies a window to the user through the window title and it also serves as a visual cue to the user that he/she may move the window. The window title bar typically includes a system menu icon, the title of the window, and window-sizing icons.

The action bar is the area of the window that provides access to the action of an application. It is usually positioned directly below the title bar. Scroll bars provide the user with a visual cue that more information is available and that the unseen information can be manipulated into view by using a mouse or other pointing device to scroll the information. The remainder of the area inside the window border is the client area. The client area is the focus of the user's attention and it is where the user is presented with the objects on which they perform their work.

There are certain deficiencies in the presently existing window implementation. The various bars occupy a substantial amount of screen real estate. The area occupied by the bars decreases the size of the client area. Since users perform their work in the client area, their work space is limited. The information and the actions that are available in the bars are useful, but they are not needed all the time. Most of the time, the bars only clutter the window.

SUMMARY OF THE INVENTION

In the present invention, the window title bar, action bar, and scroll bars are replaced with an icon or other small visual handle or tab. The window icon is placed at the top of the object or application window as a default. However, the user may place the window icon at any user selected place along the window border or frame. When multiple windows are stacked on the screen, the window icons arrange themselves such that they remain visible and available for selection by the user. If desired, the user may display a title block or a context menu adjacent to the window icon.

DESCRIPTION OF THE PREFERRED EMBODIMENT

Figure 1:
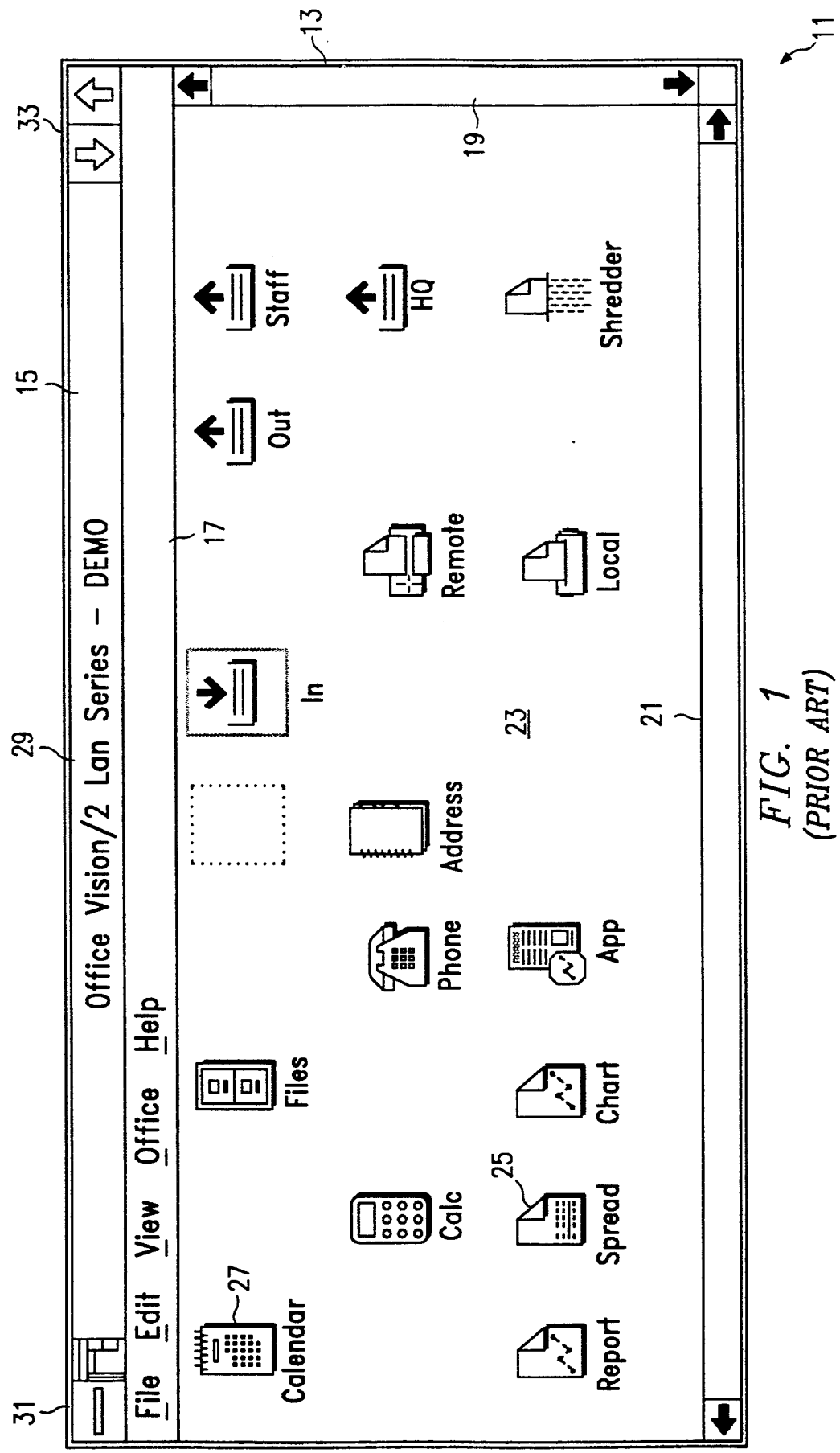
FIG. 1 is a pictorial view of a window of the prior art.

Referring now to the drawing, and first to FIG. 1, a window of the prior art is designated generally by the numeral 11. Window 11 includes a border or frame 13 that forms the outer boundary of the window. Contained within border 13 are a title bar 15, an action bar 17, and scroll bars 19 and 21. The remainder of window 11 consists of a client area 23, which is populated with a plurality of icons, including a spreadsheet icon 25 and a calendar icon 27.

Title bar 15 includes the title window 29, which identifies the window, a system menu icon 31, and window-sizing icons 33. System menu icon 31 allows the user to display a pull down menu containing actions that the user can perform on the window. Such actions are related to the window itself and not to the application that is displayed in the window. For example, actions include MOVE, which allows the user to reposition the window on the screen, MINIMIZE, which reduces the window to an icon, and MAXIMIZE, which enlarges the window to the size of the screen.

Window-sizing icons 33 provide a fast way to use the mouse or pointing device to select the system menu actions of MAXIMIZE and MINIMIZE.

Action bar 17 contains a list of the actions of the application shown in the window. Each action of the list in the action bar has associated with it a pull down menu that lists the individual actions that are contained within the each general action listed in action bar 17. For example, FILE pull down enables users to work with files through actions that manipulate the file as a whole. The individual actions contained within the FILE action include NEW which allows users to create a new file, and SAVE which writes the existing file to a storage device.

Scroll bars 19 and 21 allow the user to move the window to view data located outside borders 13. The window is sizable, but the the data is not normally scalable. Thus, when the dimensions and the window are changed, some data may not be visible. The scroll bars allow the user to see data outside the window.

Figure 2:
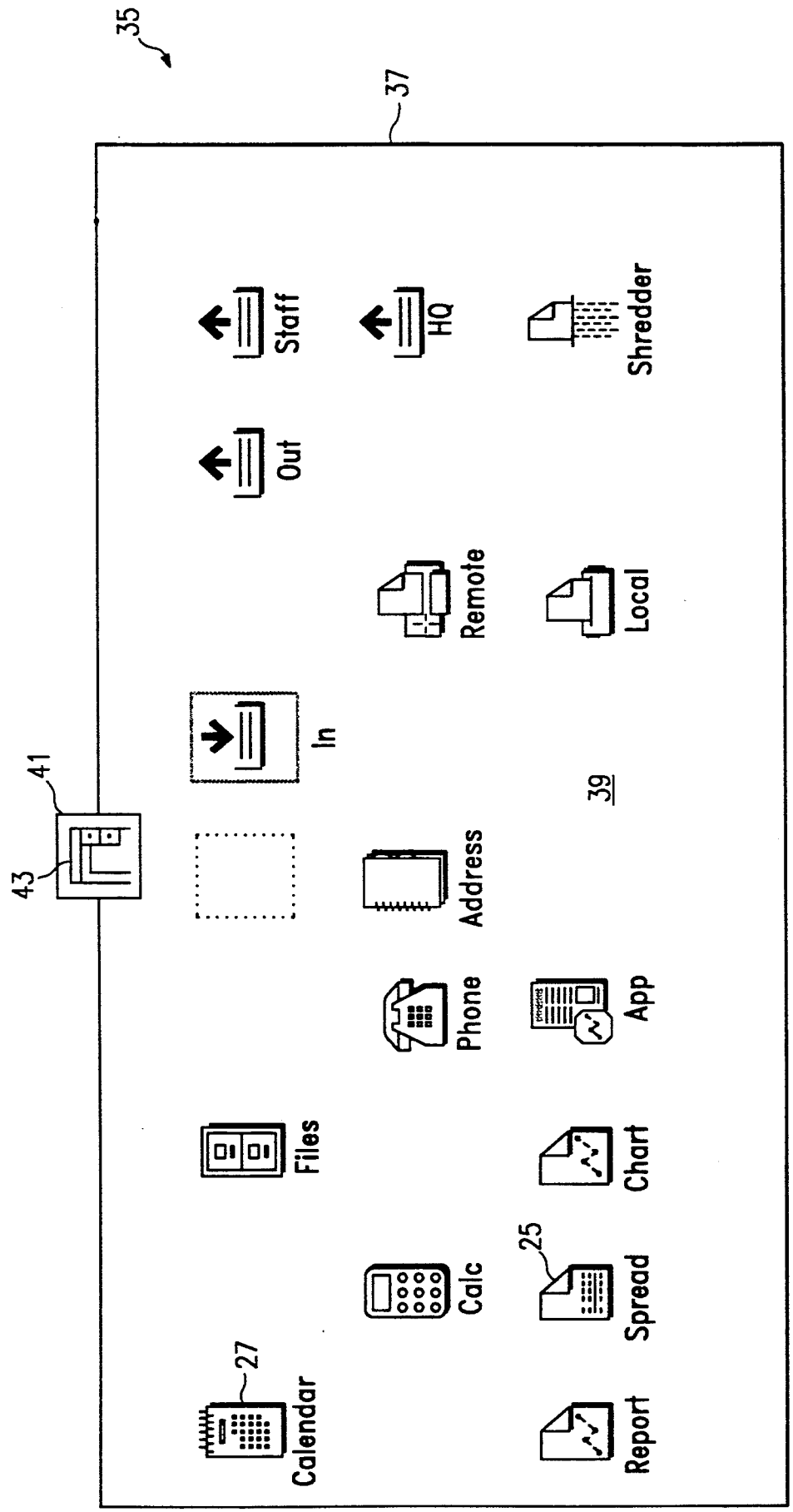
FIG. 2 is a pictorial view of a window of the present invention.

Turning to FIG. 2, the window of the present invention is designated generally by the numeral 35. Window 35 consists simply of a border 37 that encloses a client area 39. Border 37 has attached thereto a tab 41 that contains a window icon 43. Window icon 43 identifies window 35 as the "WORKPLACE" window. Client area 39 is populated with icons similar to those shown in FIG. 1.

Figure 3:
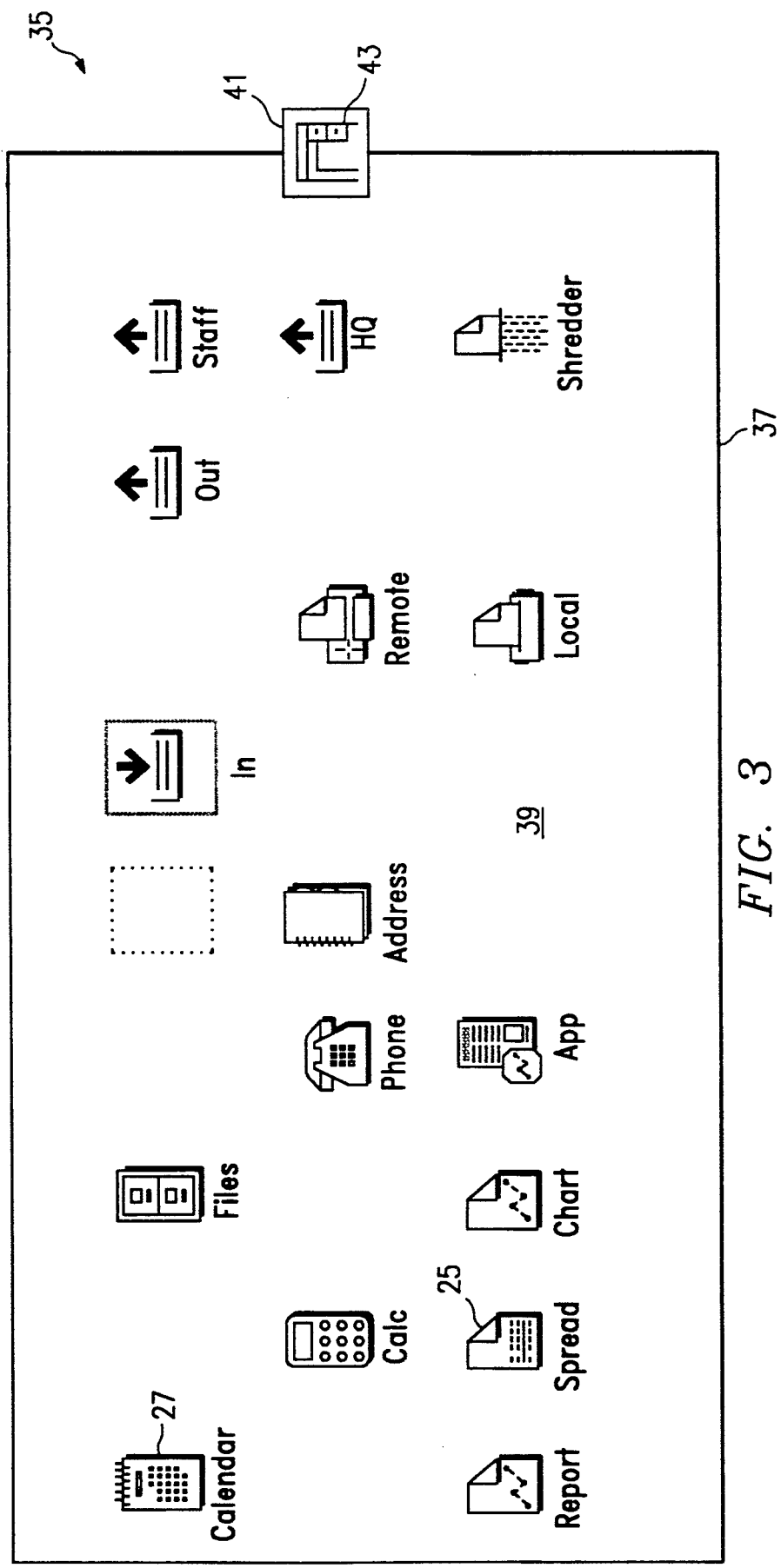
FIG. 3 is a pictorial view of a window similar to FIG. 2 with the window icon repositioned.

Tab 41 with window icon 43 is positioned as a default at the top center of window 35. However, referring to FIG. 3, the user may reposition tab 41 at any user selected location on border 37. By repositioning tab 41, window icon 43 is allowed to remain visible on the screen when windows are stacked on top of window 35, thereby allowing the user to find and access window 35 easily.

Figure 5:
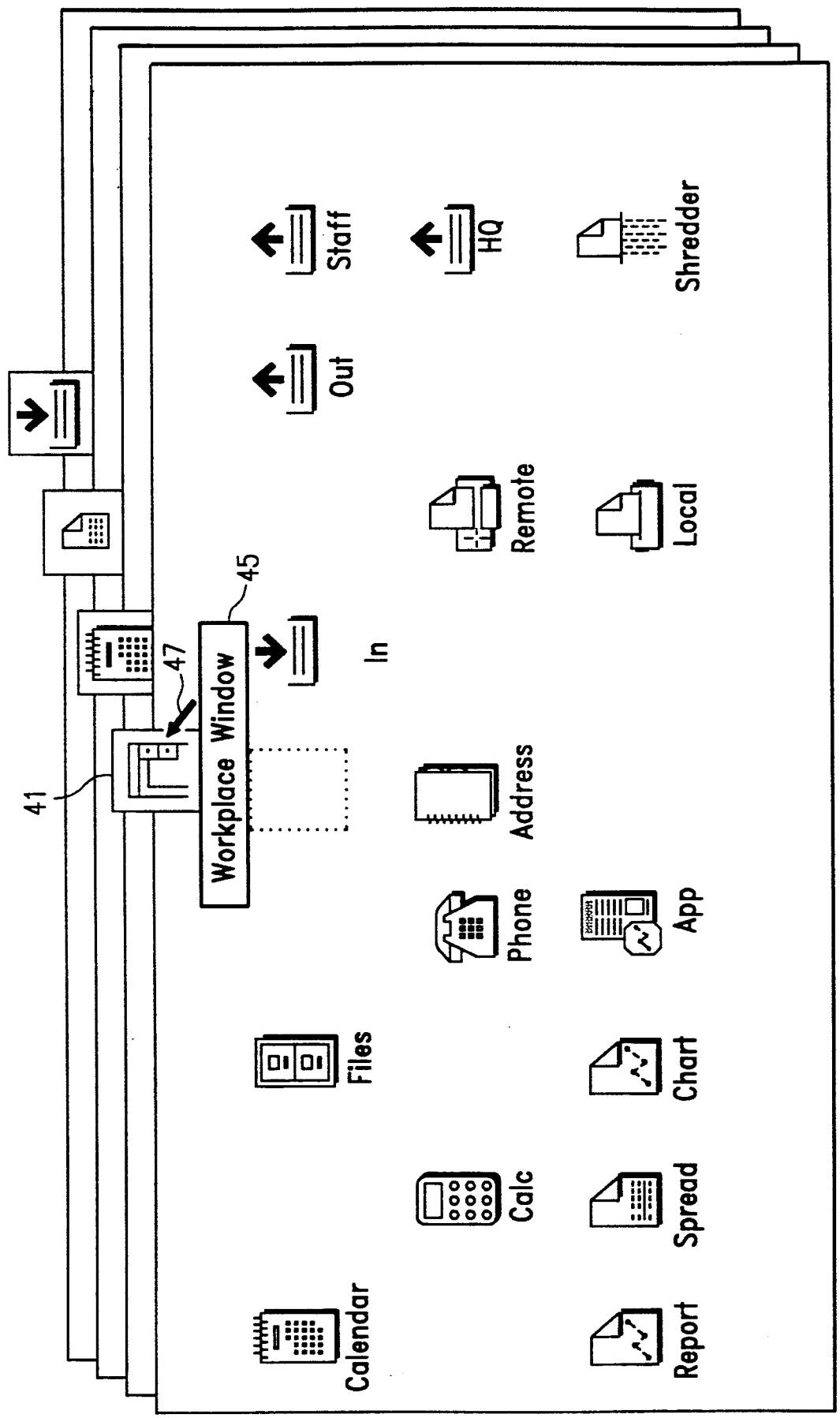
FIG. 5 is a pictorial view similar to FIG. 4 with a title block displayed.
Figure 6:
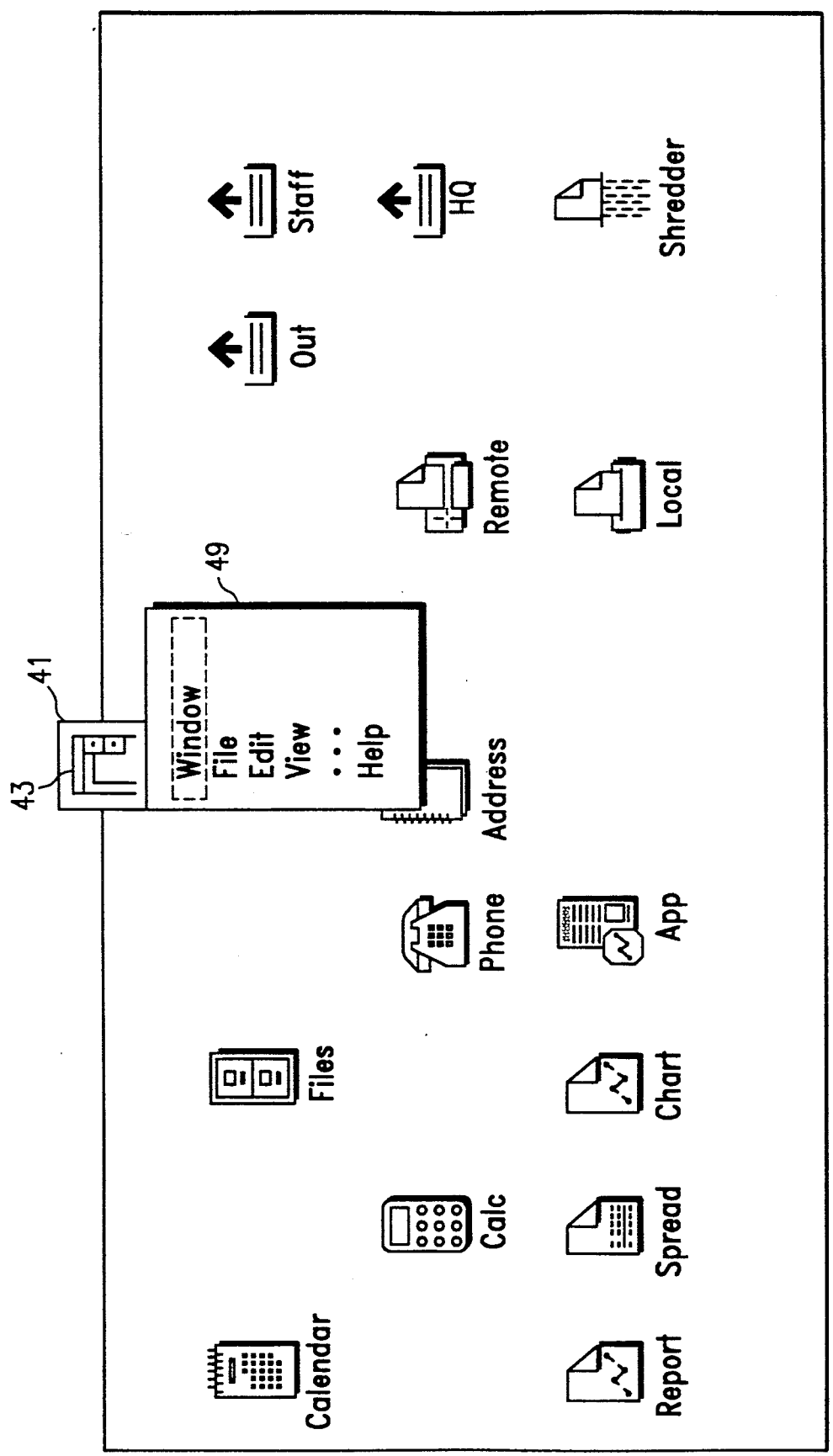
FIG. 6 is a pictorial view of a window of the present invention with a context menu displayed.

In the present invention, the title bar and action bar are eliminated but the information that is available in those bars is available upon request by the user. For example, the user may display a title bar 45 simply by pointing at tab 41 with a mouse driven pointer 47, as shown in FIG. 5. By pointing to tab 41 and clicking one of the mouse buttons, the user may display the context menu 49, as shown in FIG. 6, which displays the actions listed in action bar 17.

Figure 4:
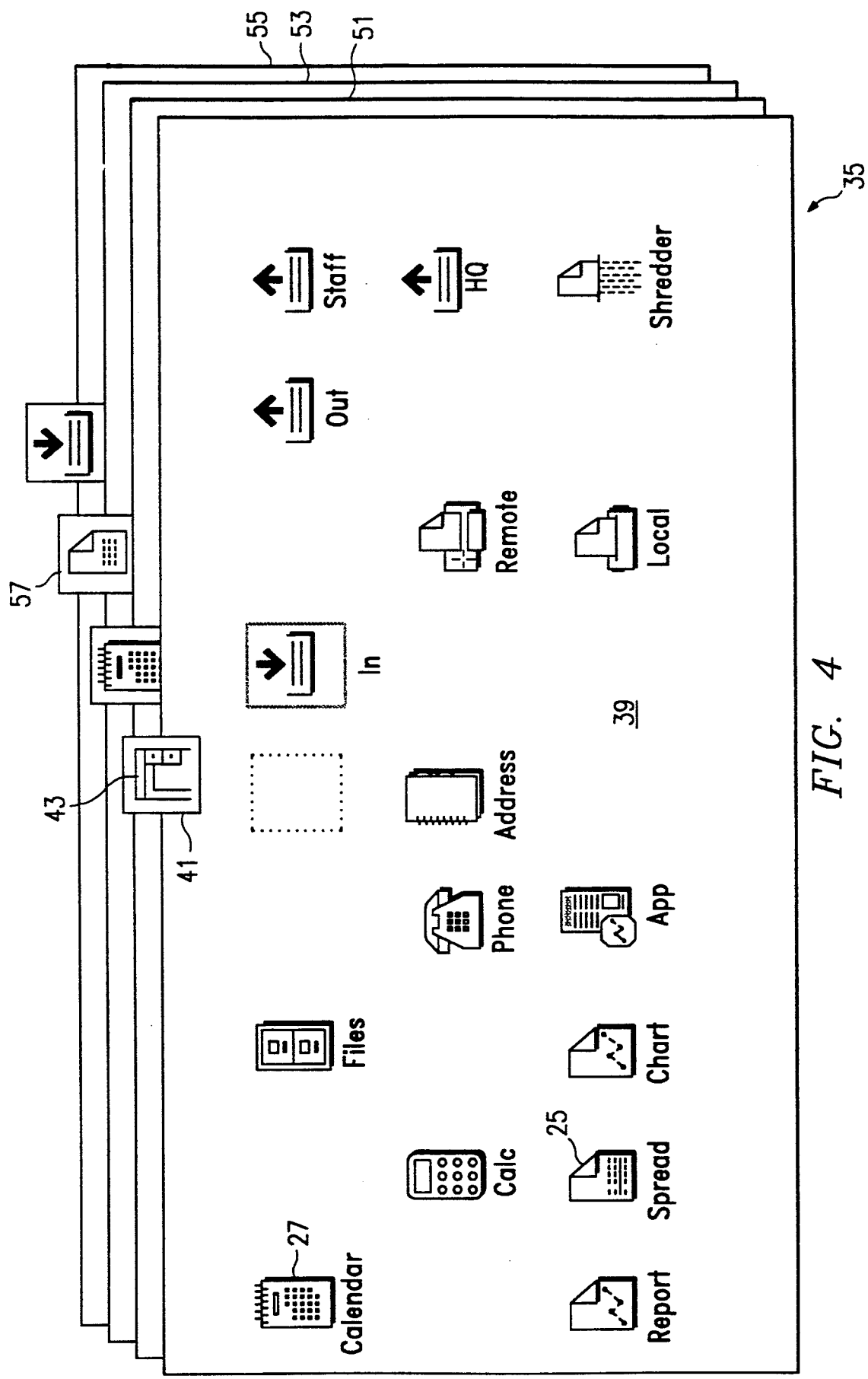
FIG. 4 is a pictorial view showing multiple stacked windows.

As shown in FIG. 4, when multiple windows are stacked, the tabs form index tabs that facilitate locating and identifying windows that are covered over by other windows. In FIGS. 4 and 5, workplace window 35 overlays the calendar window 51, a spreadsheet window 53, and an in-basket window 55. To work with the spreadsheet application, for example, the user points to the spreadsheet tab 57 and clicks one of the mouse buttons, which causes spreadsheet window 53 to replace workplace window 35 on the top of the stack of windows. In the present invention, the tabs are automatically spread out along the tops of the windows so that they are always visible.

Figure 7:
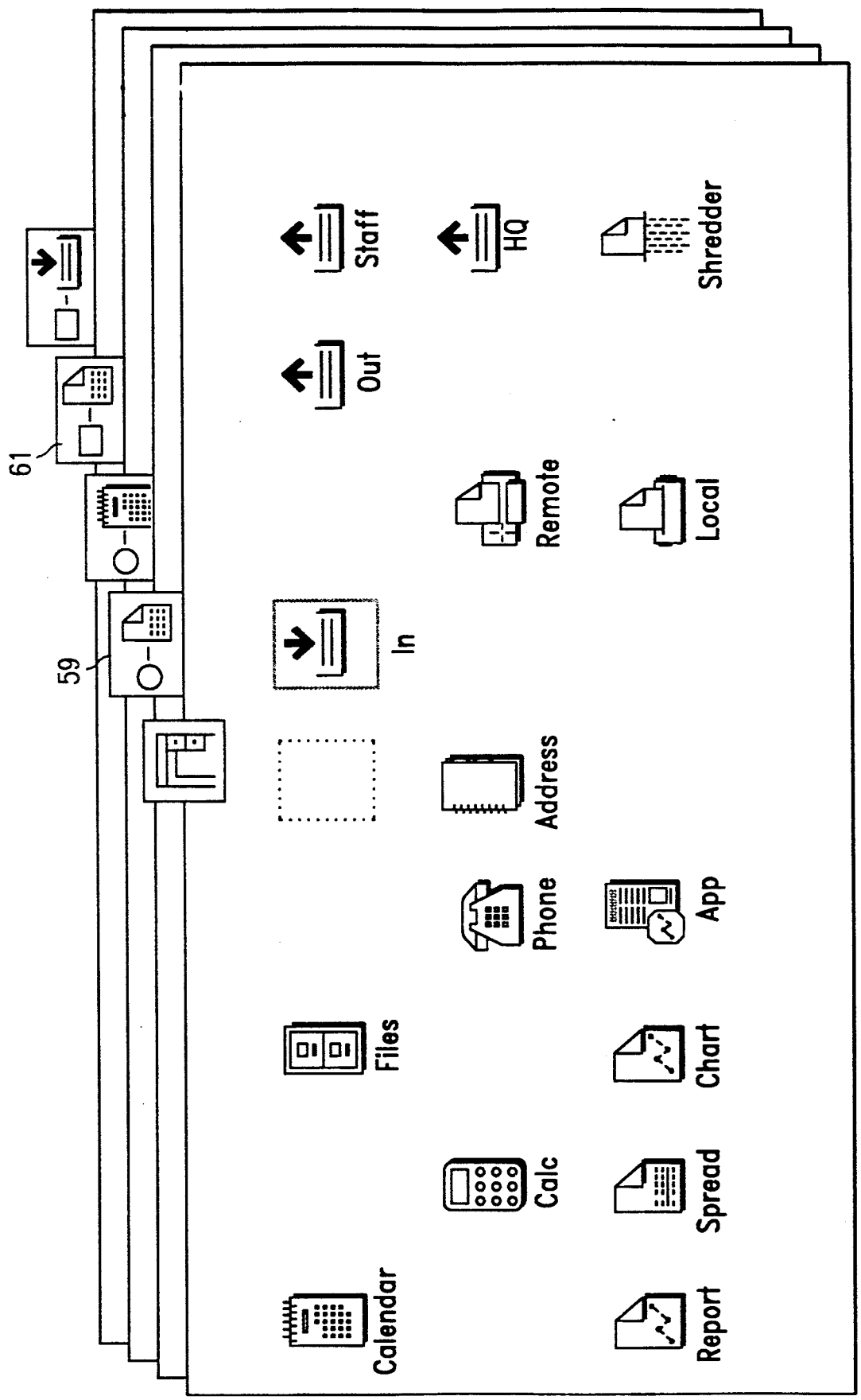
FIG. 7 is a pictorial view of stacked windows with user created window icons.

Referring now to FIG. 7, the present invention allows the user to create icons to be placed in the tabs. For example, the user can add a circle to the spreadsheet icon in tab 59, thereby to distinguish it from the square and spreadsheet icon in tab 61. The present invention includes a routine that allows the user to sort through windows. For example, as shown in FIG. 7, the circle icon windows and the square icon windows are separated from each other.

Figure 8:
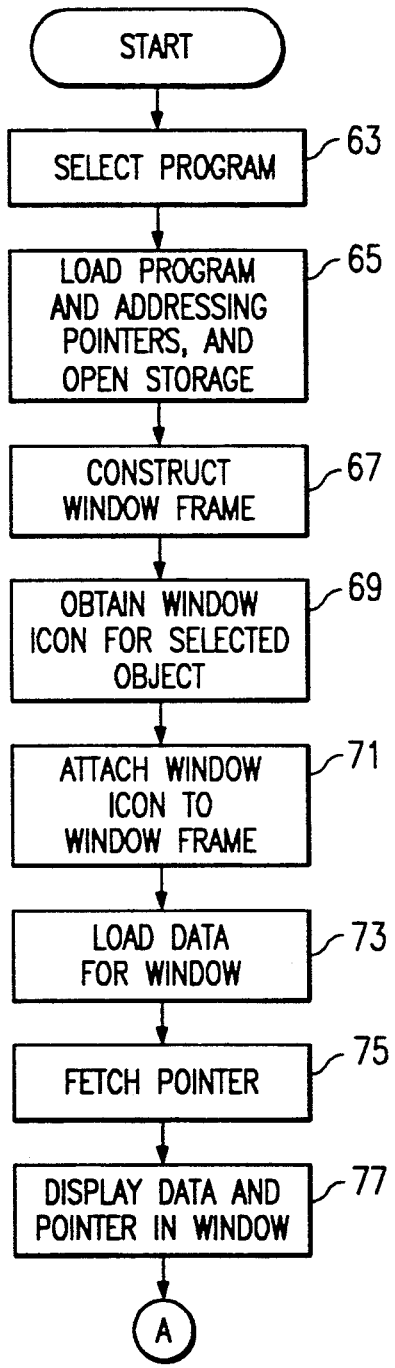
FIGS. 8–10 comprise a flowchart of the software implementation of the present invention.
Figure 9:
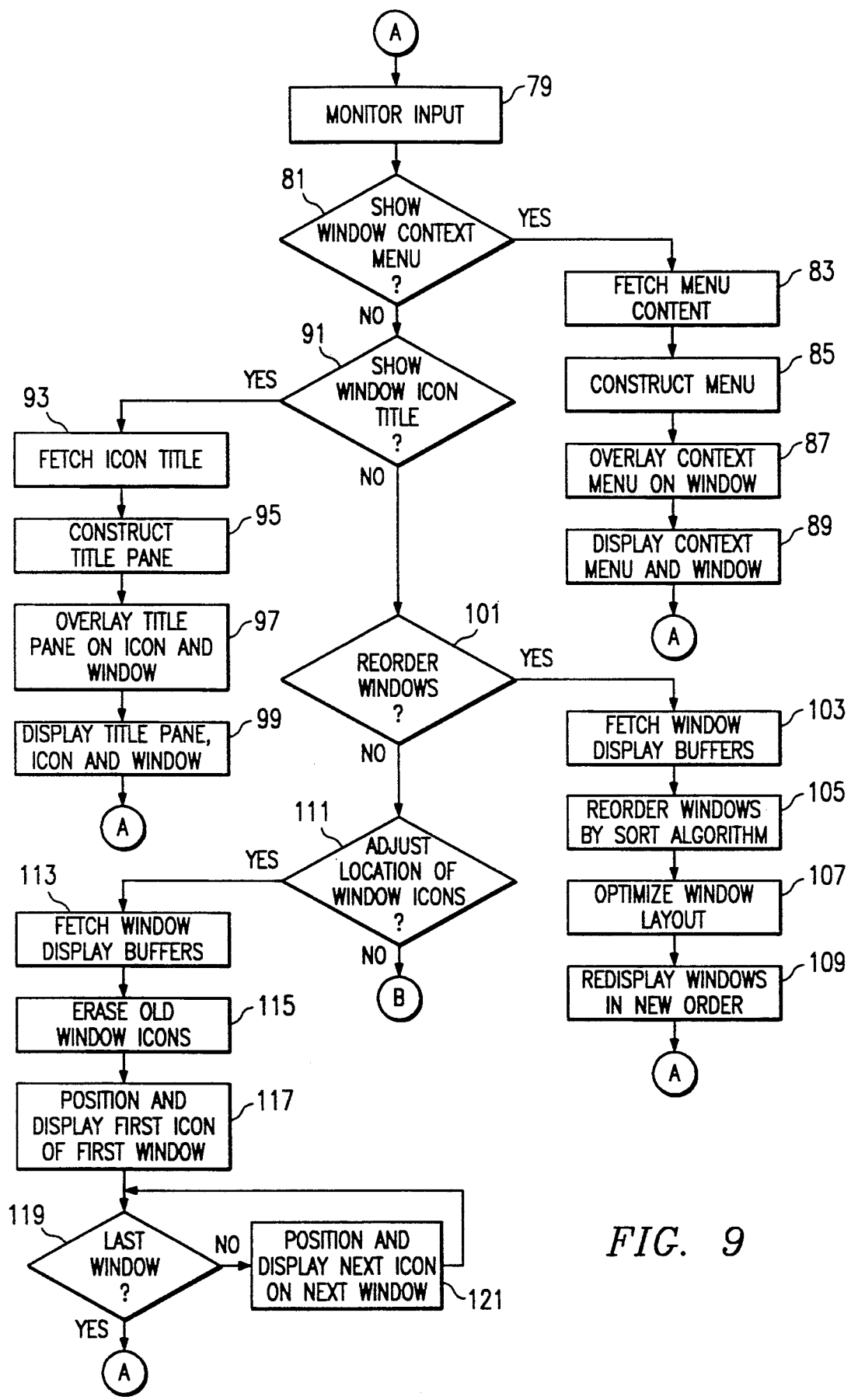
Figure 10:
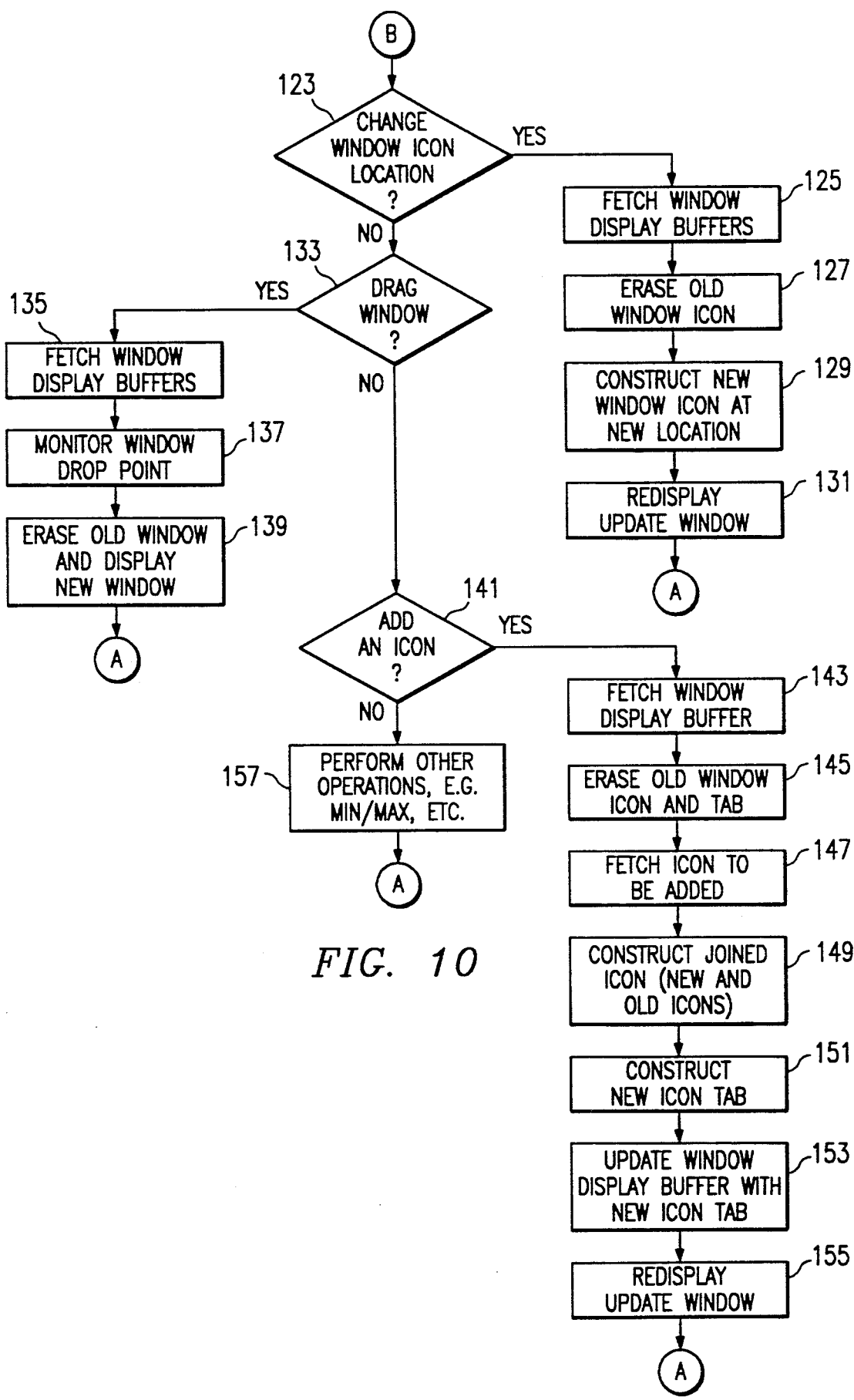

Turning now to FIGS. 8-10, there is shown a flowchart of the software implementation of the present invention. Referring first to FIG. 8, a program is selected at block 63. Upon selection, the program and addressing pointers are loaded and storage is opened at block 65. Then, in block 67, the window frame is constructed. After the window frame has been constructed, the window icon for the program is selected at block 69 and it is attached to the window frame at block 71 Then, the data for the window is loaded at block 73, the mouse pointer is fetched at block 75, and the data and the mouse pointer are displayed in the window at block 77.

Referring now to FIG. 9, after the window has been constructed and the data is displayed therein, the input is monitored at block 79. As shown at decision block 81, if the user desires to display the window context menu, the menu contents are fetched at block 83. After the contents are fetched, the menu is constructed at block 85 and overlain on the window at block 87. Then, the menu and window are displayed at block 89, thereupon the program returns to block 79 and continues to monitor the input.

As shown at decision block 91, if the operator desires to display the window icon title, the program fetches the icon title at block 93, and constructs a title pane at block 95. Then, at block 97, the title pane is overlaid on the icon and window and the title pane, icon and window are displayed at block 99, whereupon the program returns to block 79 to monitor the input.

Referring to decision block 101, if the operator desires to reorder the windows, the window display buffers are fetched at block 103 and the windows are reordered according to a sort algorithm at block 105. Then, the window layout is optimized at block 107 and the windows are re-displayed in the new order at block 109, whereupon the program returns to block 79 and continues to monitor the input. Referring to decision block if the operator desires to adjust the location of the window icons, the 20 window display buffers are fetched at block 113 and the old window icons are erased at block 115. Then, the window icon of the first window is positioned and displayed at block 117. If, at decision block 119, the window is not the last window, then the next icon is positioned on the next window and displayed at block 121. The program goes back to decision block 119 in a loop until the last icon is positioned and displayed on the last window, whereupon the program returns to block 79 to monitor the input.

Referring now to FIG. 10, if the operator desires to change the window icon location, at decision block 123, the window display buffers are fetched at block 125 and the old window icon is erased at block 127. Then, at block 129, a new window icon is constructed at a new location. After the new window icon is displayed, the updated window re-displayed at block 131 and the program returns to block 79 to continue to monitor the input. If the operator desires to drag the window, at decision block 133, again, the window display buffers are fetched, at block 135. The program monitors the window drop point, at block 137, and when the drop point is reached, the old window is erased and the new window is displayed at block 139. After the window has been dropped, the program returns to block 79 and continues to monitor the input.

If the operator desires to add an icon, at decision block 141, the window display buffers are fetched at block 143 and the old icon and tab are erased at block 145. Then, at block 147, the icon to be added is fetched and the joined icon, Which consists of the old and new icons, is constructed at block 149. Then, at block 151, the new icon tab is constructed and the window display buffer is updated with the new icon tab at block 153. Finally, the updated window is re-displayed at block 155, whereupon the program returns to block 79 to continue to monitor the input.

As is shown generally at block 157, those skilled in the art will recognize that other normal window operations, for example maximizing and minimizing, can be performed.

In summary, the present invention provides a unique system for and method of presenting windowing information, accessing windowing functions, and providing additional window organization capabilities. The results for the user include reduced visual complexity on computer screens, increased screen space for displaying data, and increased functionality.

While the invention has been particularly shown and described with reference to a preferred embodiment, those skilled in the art will understand that various changes in form and detail may be made without departing from the spirit and scope of the invention.

What is claimed is:

1. A method of operating a computer system that includes a display screen, which comprises the computer-implemented steps of:
   constructing a first window frame to form a first window on the screen;
   attaching a first window icon to said first window frame, said first window icon identifying said first window and being user selectable to perform operations associated with said first window; and,
   displaying data in said first window frame.

2. The method as claimed in claim 1, including the step of:
   displaying a title block adjacent to said window icon in response to user interaction with said first window icon.

3. The method as claimed in claim 1, including the step of:
   displaying a context menu adjacent to said window icon in response to user interaction with said first window icon.

4. The method as claimed in claim 1, including the step of:
   repositioning said window icon at a user selected location on said window frame.

5. The method as claimed in claim 1, including the steps of:
   constructing a second window frame to form a second window on said screen, said second window frame at least partially overlaying said first window frame and obscuring the data displayed in the overlain portion of said first window frame;
   attaching a second window icon to said second window frame, said second window icon identifying said second window and being user selectable to perform operations associated with said second window;
   displaying data in said second window frame; and,
   arranging said window icons such that both of said window icons are visible at the same time on said screen.

6. The method as claimed in claim 5, wherein said second window frame substantially completely overlies said first window frame.

7. The method as claimed in claim 5, including the steps of:
   transposing the positions of said first and second window frames in response to user interaction with said first window icon whereby said first window frame at least partially overlies said second window frame.

8. A method of operating a computer system that includes a display screen, which comprises the computer-implemented steps of:
   displaying a plurality of icons on said display screen;
   constructing a first window frame to form a first window on said screen in response to user interaction with one of said icons;
   attaching a first window icon to said first window frame, said first window icon identifying said first window and being user selectable to perform operations associated with said first window; and
   displaying data in said first window frame.

9. The method as claimed in claim 8, including the step of repositioning said first window icon at a user selected location on said first window frame.

10. The method as claimed in claim 8, including the steps of:
    constructing a second window frame to form a second window on said screen in response to user interaction with a second icon, said second window frame at least partially overlaying the first window frame and obscuring the data displayed in the overlain portion of said first window;
    attaching a second window icon to said second window frame, said second window icon identifying said second window and being user selectable to perform operations associated with said second window;
    displaying data in said second window frame; and,
    arranging said window icons such that both of said window icons are visible on said screen at the same time.

11. The method as claimed in claim 10, including the steps of:
    transposing the positions of said first and second window frames in response to user interaction with said first window icon whereby said first window frame at least partially overlies said second window frame.

12. A method of operating a computer system that includes a display screen, which comprises the computer-implemented steps of:
    displaying a plurality of windows on said screen, each of said windows including a frame; and,
    attaching a window icon to each of said frames, each said window icon identifying a corresponding window and being user selectable to perform operations associated with the corresponding window.

13. The method as claimed in claim 12, including the steps of:
    stacking said windows on top of each other; and,
    arranging said window icons such that all of said window icons are visible on said display screen at the same time.

14. A method of operating a computer system having a display screen, which comprises the computer-implemented steps of:
    constructing a window frame on the screen in response to a user selection of an application;
    attaching a tab to said window frame; and,
    displaying in said tab a window icon representing said application, said window icon being user selectable to perform operations associated with the application.

15. The method as claimed in claim 14, including the step of:
    displaying a user selected icon in said tab along with said window icon.

16. The method claimed in claim 14, including the step of displaying a plurality of application windows on said screen, each of said windows including a frame with a tab attached thereto, and each tab having displayed therein a window icon.

17. The method as claimed in claim 16, including the step of:
    adding to selected tabs a user selected icon.

18. The method as claimed in claim 17, including the step of:
    grouping windows having said user selected icon.

19. In a method of presenting data to a computer system user that includes a window including a window frame with data displayed within said window frame, the computer-implemented improvement which comprises:
    attaching a window icon to said window frame, said window icon identifying said window and being user selectable to perform operations associated with said window.

* * * * *